(12) United States Patent
Graham (10) Patent No.: US 10,023,452 B2
(45) Date of Patent: Jul. 17, 2018

(54) BOTTLE POPPER

(71) Applicant: Clinton Graham, Milton, MA (US)

(72) Inventor: Clinton Graham, Milton, MA (US)

( * ) Notice: Subject to any disclaimer, the term of this patent is extended or adjusted under 35 U.S.C. 154(b) by 0 days.

(21) Appl. No.: 15/801,480

(22) Filed: Nov. 2, 2017

(65) Prior Publication Data
US 2018/0170736 A1    Jun. 21, 2018

Related U.S. Application Data (60) Provisional application No. 62/436,472, filed on Dec. 20, 2016.

(51) Int. Cl.
| | | |
|---|---|---|
| *B67B 7/16* | (2006.01) | |
| *G01K 13/00* | (2006.01) | |
| *G01K 1/14* | (2006.01) | |

(52) U.S. Cl.
CPC .............. *B67B 7/164* (2013.01); *G01K 1/143* (2013.01); *G01K 13/00* (2013.01)

(58) Field of Classification Search
CPC ................................ B67B 7/164; G01K 1/143
USPC ........................................................ 81/3.09
See application file for complete search history.

(56) References Cited

U.S. PATENT DOCUMENTS

| | | | | |
|---|---|---|---|---|
| 4,414,866 A | * | 11/1983 | Kichijyo ................. | B67B 7/162 81/3.56 |
| 6,142,039 A | | 11/2000 | Herring | |
| 6,749,318 B1 | * | 6/2004 | Palacios .................. | B25F 1/003 30/169 |
| 7,152,506 B2 | * | 12/2006 | Wang ...................... | B67B 7/162 81/3.55 |
| 7,265,673 B2 | * | 9/2007 | Teller ................... | B67D 1/1405 222/23 |
| 8,434,388 B2 | * | 5/2013 | Chaffins .................... | B67B 7/16 81/3.08 |
| 2006/0238346 A1 | | 10/2006 | Teller | |
| 2010/0071513 A1 | | 3/2010 | Wang | |

FOREIGN PATENT DOCUMENTS

| | | |
|---|---|---|
| CN | 204211453 U | 3/2015 |
| ES | 1039080 U | 10/1998 |

OTHER PUBLICATIONS

International Search Report and Written Opinion for corresponding PCT Appl No. PCT/US17/59653, dated Feb. 5, 2018.

\* cited by examiner

*Primary Examiner* — Hadi Shakeri
(74) *Attorney, Agent, or Firm* — Fish & Richardson P.C.

(57) ABSTRACT

A bottle opener apparatus has an inner body collar configured to rest on a top portion of a bottle placed within the bottle opener an outer body collar slidably connected to the inner body collar, with one or more springs attached to the inner body collar and the outer body collar, the one or more springs configured to be compressed or released when the outer collar slides relative to the inner collar and one or more levers pivotably attached the outer collar, the one or more levers configured to remove a bottle cap from the bottle and eject the bottle cap into the air when the outer collar slides relative to the inner collar in an ejection movement. One or more sensors are configured to collect data when the bottle is placed within the inner collar and a transmitter is configured to transmit the collected data to an external receiver.

18 Claims, 7 Drawing Sheets

BOTTLE POPPER

CROSS-REFERENCE TO RELATED APPLICATIONS

This application claims priority to U.S. Provisional Application Ser. No. 62/436,472, filed on Dec. 20, 2016, the contents of which are incorporated herein by reference.

TECHNICAL FIELD

This invention relates to bottle openers.

BACKGROUND

Soda, beer, champagne and wine bottles have been opened in various ways throughout the years. Some ways have been more tedious than others. Generally the experience of opening a bottle is a rather mundane task and simply executes the function of opening the container. While some bottles employ removable corks and tabs, a considerable number of bottles include a removable cap that is made out of one or more metallic materials.

SUMMARY

In some embodiments, a bottle opener apparatus comprises an inner body collar configured to rest on a top portion of a bottle placed within the bottle opener an outer body collar slidably connected to the inner body collar, with one or more springs attached to the inner body collar and the outer body collar, the one or more springs configured to be compressed or released when the outer collar slides relative to the inner collar and one or more levers pivotably attached the outer collar, the one or more levers configured to remove a bottle cap from the bottle and eject the bottle cap into the air when the outer collar slides relative to the inner collar in an ejection movement. One or more sensors are configured to collect data when the bottle is placed within the inner collar and a transmitter is configured to transmit the collected data to an external receiver.

In some embodiments, the collected data comprises geographical location and/or time information. The springs are configured to eject the bottle cap into the air straight from the bottle opener or at an angle. The bottle opener changes shape while it is ejecting the bottle cap into the air and then returns to its original shape. The bottle opener is configured to fit onto a keychain. The bottle opener has one or more displays on an outer surface of the bottle opener, that are bendable and detachable from the bottle opener, and configured to be flattened to provide a larger and flatter display surface. The levers are pivotably attached to the outer body collar at one end and to the inner body collar near a second end. The levers are configured to move from a direction pointing generally downwards to a generally upwards direction when the outer body collar is displaced relative to the inner body collar. The outer body collar has a projection and the inner body collar has a projection that together compress the springs when the outer collar is displaced relative to the inner body collar. The levers comprise a slot near the second end, the slots configured to receive a pin attached to the inner collar body. The bottle opener is configured to return to an initial rest state with the springs uncompressed following the ejection movement.

In some embodiments a bottle opener system comprises a bottle opener apparatus comprising an inner body collar configured to rest on a top portion of a bottle placed within the bottle opener, an outer body collar slidably connected to the inner body collar, one or more springs attached to the inner body collar and the outer body collar, the one or more springs configured to be compressed or released when the outer collar slides relative to the inner collar, one or more levers pivotably attached the outer collar, the one or more levers configured to remove a bottle cap from the bottle and eject the bottle cap into the air when the outer collar slides relative to the inner collar in an ejection movement. One or more sensors configured to collect data bottle when the bottle is placed within the inner collar and a transmitter is configured to transmit the collected data to an external receiver, and an external computing system is configured to receive the data transmitted by the transmitter.

In some implementations, the collected data comprises geographical location and/or time information. One or more displays are on an outer surface of the bottle opener. The levers are pivotably attached to the outer body collar at one end and to the inner body collar near a second end. The levers are configured to move from a direction pointing generally downwards to a generally upwards direction when the outer body collar is displaced relative to the inner body collar. The outer body collar has a projection and the inner body collar has a projection that together compress the springs when the outer collar is displaced relative to the inner body collar. The levers comprise a slot near the second end, the slots configured to receive a pin attached to the inner collar body.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
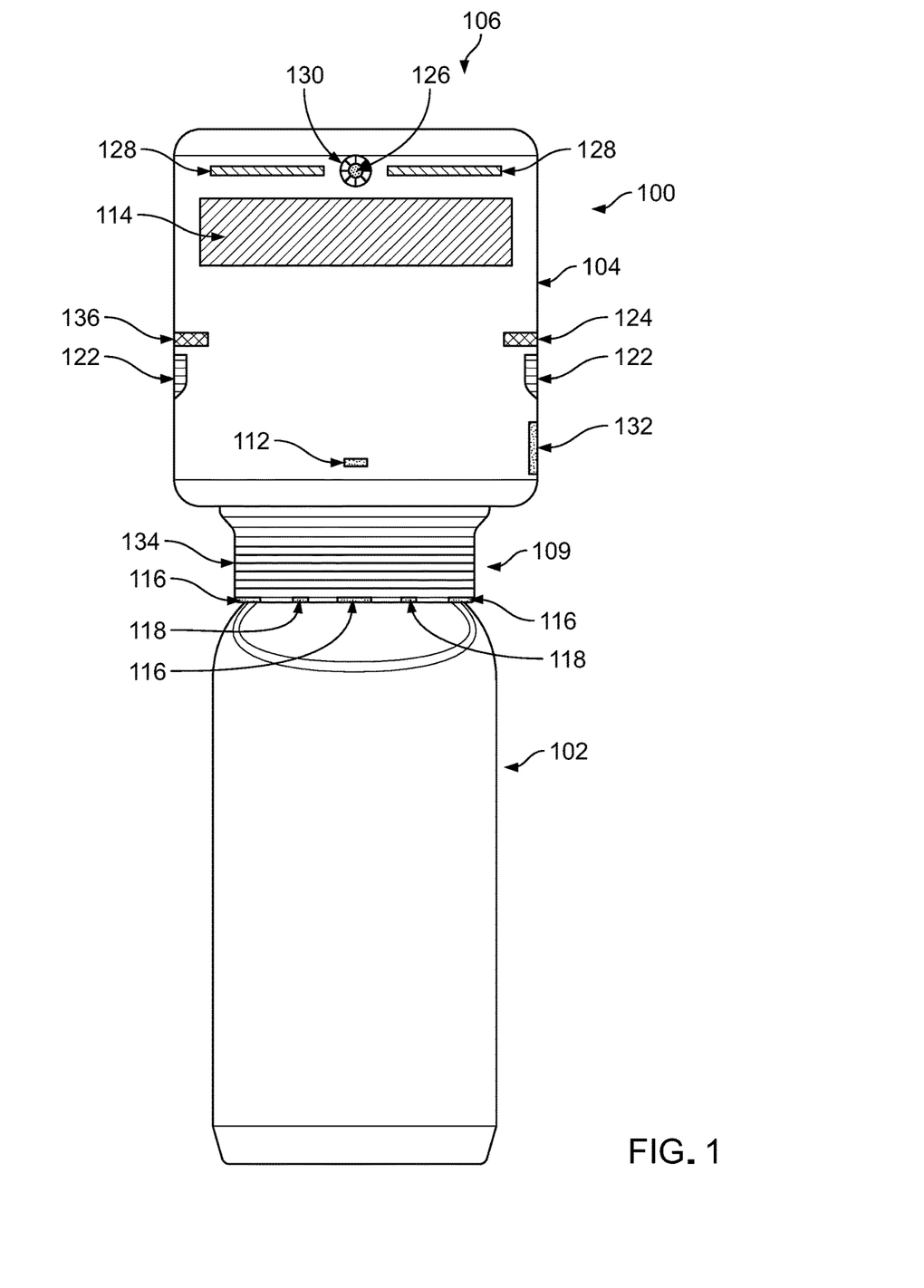
FIG. 1 is a schematic of a bottle opener is positioned on a top portion of a bottle.

Referring to FIG. 1, a bottle opener 100 is an apparatus that improves the user experience of opening a bottle by allowing the cap of the bottle to be ejected into the air. The bottle opener 100 is mounted on top of container such as a beer, soda, champagne or wine bottle and is able to fit on various size bottles due to its adjustability. Levers inside the bottle opener 100 attach to the bottle's cap, and a user pulling down the outer surface 104 of the bottle opener 100 causes the bottle cap to be removed from the bottle and ejected into the air.

In FIG. 1 the bottle cap is hidden from view as it is inside the bottle opener 100 while the bottle opener 100 is positioned on a bottle 102. The bottle opener 100 is at rest on top of the bottle 102. The outer surface 104 of the bottle opener 100 is largely smooth, which allows for brand advertising. The outer surface 104 of the bottle opener 100 can also have a grip surface for right handed and/or left handed people. The outer surface 104 can be made up from various different materials and combinations of different materials for example, steel, titanium, copper, gold, etc. The outer surface 104 of opener can be various shapes and sizes, and in one embodiment the outer surface 104 can be one to 6 inches tall and one to 4 inches wide in diameter and cylindrical in shape.

An opening 106 at the top of the bottle opener 100 allows for the bottle opener 100 to eject a bottle cap into the air. The bottle opener 100 has an inner body collar 200 (shown in FIG. 2) that rests on the bottle 102 itself. The bottom portion 109 of the bottle opener 100 includes scanners 116 and temperature sensors 118. The scanners 116, which can include an optical scanner, can identify the brand of the beverage inside bottle 102 and with the help from a global positioning system (GPS) receiver 214 (shown in FIG. 2), collect data of the geographical location of the bottle 102 when it is being opened by the bottle opener 100. The temperature sensor 118 measures the temperature of the bottle 102 while it is in contact with and while it is being opened by the bottle opener 100.

The bottle opener 100 allows the end user to look forward to the act of opening a bottle and to the eventual next bottle. The bottle opener 100 can be waterproof, heatproof, and coldproof. It can be durable to withstand falls and other hazardous situations. The bottle opener 100 could support a lighter mechanism for starting a fire with different types of chemical reactions.

As shown in FIG. 1, the bottle opener 100 includes a display 114 that can be a light emitting diode (LED)/liquid crystal display (LCD) or another form of light emitting diode such as Indium tin Oxide, OLED, LED, LCD, nanotubes, and/or nanobuds. Electronic paper could be used as the display, as a light-emitting screen that can display live animated advertisements from companies and other messages. Various other technologies of display could be used as well for the display 114. The display 114 can be bendable, as are displays of some televisions and cell phones. A middle portion of the display could be fastened and secured to the outer surface 104 of the opener while the other parts of the display 114 could detach from the outer surface 104 (e.g. unfold from the middle portion and spread out) to be made into a flat screen. This multifunctional display 114 could allow users to see a bigger picture.

A wireless transmitter 112 allows data to be collected and stored in a central memory within the bottle opener 100, allowing data to be collected and then transmitted, e.g., to inform various beverage producers and brands of various data. Data could also be sent to a computer network with the help of the wireless transmitter 112. Nanotechnology and quantum chips could be used to improve the technology on the bottle opener 100 as computing power is more efficiently scaled to fit the bottle opener structure. Artificial intelligence could also be implemented with a central processing unit (CPU) so that the technology of the bottle opener 100 can naturally evolve and be automatically updated with the latest software/other technological advances.

The bottle opener 100 can also be able to communicate wirelessly via the wireless transmitter 112 with other devices such as, laptops, smartphones, tablets etc. This communication allows for orders to be made between various other devices at one time, for example, by inputting a certain code so that an end user can redeem rewards as well as receive updates while in range of a wireless signal. Also, brands can send, with the permission of in-range patrons, invitations to sign up for email updates of the brand and also identify the establishment/business that the patron is visiting at the time, including a private residence. The wireless transmitter 112 can exchange information and data on and off of the opener through Wi-Fi, Bluetooth, cellular or other various frequencies.

On the sides of the bottle opener are one, two, three or more air purification slots 122 that offers an air purification/ deodorizer system that makes the surrounding area more pleasant in smell. Sound speakers 124 can be located right above the air purification/deodorizer system 122. The sound speakers can provide sound for advertisements, can be turned on or off, and can play programmable sound effects when a bottle opener 100 is ejecting a bottle cap. Sound effects can come from advertisers, brands, sports teams, etc. The sound speakers 124 could be used for various other purposes. Buttons to control this feature could be added to the bottle opener 100.

A microphone 126 is voice activated and can be located above the display 114, allowing end users to control the bottle opener 100 and its various functions with voice commands. There can be one, two, three or more microphones 126. Buttons to control this feature could be added to the bottle opener 100.

A geo mapping technology 128 maps and scans the area surrounding the bottle opener 100 to detect the number of people that are in proximity when the product is opened. With the implementation of an infrared scanner, the bottle opener would be able to understand the body temps of surrounding people and use that information for brands. Face recognition scanners would also help in detecting people by using its spatial geometry software in order to identify features of the face.

The geomapping technology 128 can implement a wireframe model method of three dimensional subsurface mapping commonly employed for the preparation of digital elevation models in surveying, hydrology, geology, and mining. The wireframe model maps a set of points having known triaxial (x,y,z) Cartesian coordinates. Prior to plotting, a gridding routine is used to place randomly located field data in a regular grid with spacing selected by the drafter. Wireframe plotting results in an open (x,y) grid with the height of each grid node corresponding to the z coordinate at that point. The wireframe model has a number of advantages over other 3D modeling methods. These include simplicity of presentation, flexibility in the use of color, and high impact value as a presentation tool. To use the technology so that the bottle opener can collect the necessary data of the surrounding area, cameras along with optical scanners would survey the area and based on those images, and a digital wireframe of the surrounding area would be composed. These scanning technologies working together could make it possible to detect clothing brands, presence of machines, whether the end user is outside or inside when opening bottle, etc. The geomapping technology 128 can use sonar, for which there are various examples of mini devices available. Ultrasonic echo-location is used to detect objects.

The device vibrates to indicate the distance to objects where the faster the vibration rate, the nearer the object. The settings as to how far objects are, comes with this device. With the use of sonar, digital wireframes, cameras and optical scanners, the geo mapping technology 128 could have a comprehensive understanding of the surrounding areas as a bottle 102 is opened. This information may be transmitted to various beverage brands via wireless transmitter 112, so help them to get a clearer picture of the types of environments in which their product is typically being used. Information produced can include the size of the surrounding area, whether it is an indoor or outdoor location, the time of day recorded when the bottle opener 100 is activated by opening a bottle cap.

The geo mapping technology 128 could utilize sonar and emit high frequency pulses in order to be able to accurately detail the surrounding area. The geo mapping technology 128 could also utilize digital wireframes of the surrounding area that could measure the size of surrounding area, including buildings, outdoor areas and other standing structures inside and outside. The sound speakers 124 along with a camera 136, could help the geo mapping technology 128 determine its surroundings. A camera 136 (which could be one, two, three or more cameras) could capture images and determine what the objects are internally, process them and push the images to a remote site and/or store it. The camera 136 could have night vision and other heat sensing technologies to determine the difference between people, animals and cars, walls, as well as other objects that give off heat. This feature is for the purpose of letting brands know how many people/potential customers are around their product when it is opened. If the bottle opener 100 can grab the attention of these people, then future revenue is possible. Augmented reality technology could improve the functionality of the geo mapping technology 128 and also leave virtual messages for other smart devices. Augmented reality adds graphics, sounds, haptic feedback and smell to the real world. The bottle opener could provide businesses a way to engage their customers by providing virtual coupons on the street, or provide messages that encourage patrons to visit their establishment. The patrons would be at home and be able to still engage with a business by seeing and being able to engage/retrieve different objects from their phone, such is available in popular cellphone-based games. This interaction could be interactive or just informational. Augmented reality provides end users a more engaging experience for businesses. Augmented reality also incorporates the sound features that this bottle opener comes with. Adding sound effects to the opening of bottles is a form of augmented reality. Buttons to control this feature could be added to the bottle opener 100. The device can also store the collected data for brands to better understand how the consumption of their products, affect various age groups, genders, etc. of people.

The bottle opener 100 can also include a breathalyzer 130 that is located near the microphone 126, which can allow detection of the blood/alcohol level of user by normal speech. And researchers say breath analyzers may one day be used to quickly identify a slew of other disorders, including cancer, leading to early detection and treatment. Buttons to control this feature could be added to the bottle opener 100.

A fingerprint scanner 132 scans fingers for identification if requested. Also this feature could detect heart rate, blood pressure, and other health related items. The fingerprint scanner 132 could be located near the bottom of the outer surface 104 of bottle opener 100 and could be on one, two, three or more locations in other areas as well on the bottle opener. Buttons to control this feature could be added to the bottle opener 100.

Temperature bands 134 located on the bottom 109 of the bottle opener 100 act as a temperature maintenance tool that is removable from the bottle opener 100 and made of replaceable elastic, durable rubber, metal or other material. The temperature bands 134 are thin rings that expand to adjust to the size of the base of the bottle 102. An example would be a stretchable rubber material including an embedded metallic (e.g., copper coil) material that could help regulate the temperature of the liquid inside of the bottle while still being elastic. When the temperature band 134 is removed from the bottle opener, it is instantly activated and helps retain the cool temperature when placed on a bottle. By removing one of the temperature bands 134, the user can place the temperature band 134 onto the base of the bottle 102 before and during consumption of the liquid in the bottle. The temperature bands 134 are not cold on the exterior nor cold to the user's skin. The temperature bands 134 could have sensors to detect temperatures.

The temperature bands 134 could also provide a light show inside of the bottle that looks like live animations, laser shows, and even advertisements being incorporated for brands. Buttons to control this feature could be added to the bottle opener 100. The temperature bands 134 would be able to work on various materials such as, glass, plastic, ceramic, as well as others, including various shapes of glasses and mugs. Other forms and shapes of the temperature bands 134 could be developed where in addition to bands, there could be disposable stickers that could be placed on a bottle and activated once placed. This sticker would have the same technology has the temperature bands 134 would have. Both the stickers and the temperature bands could work, independently or cooperatively, with the bottle opener after authorization with a certain code if purchased separately from the bottle opener 100.

Figure 2:
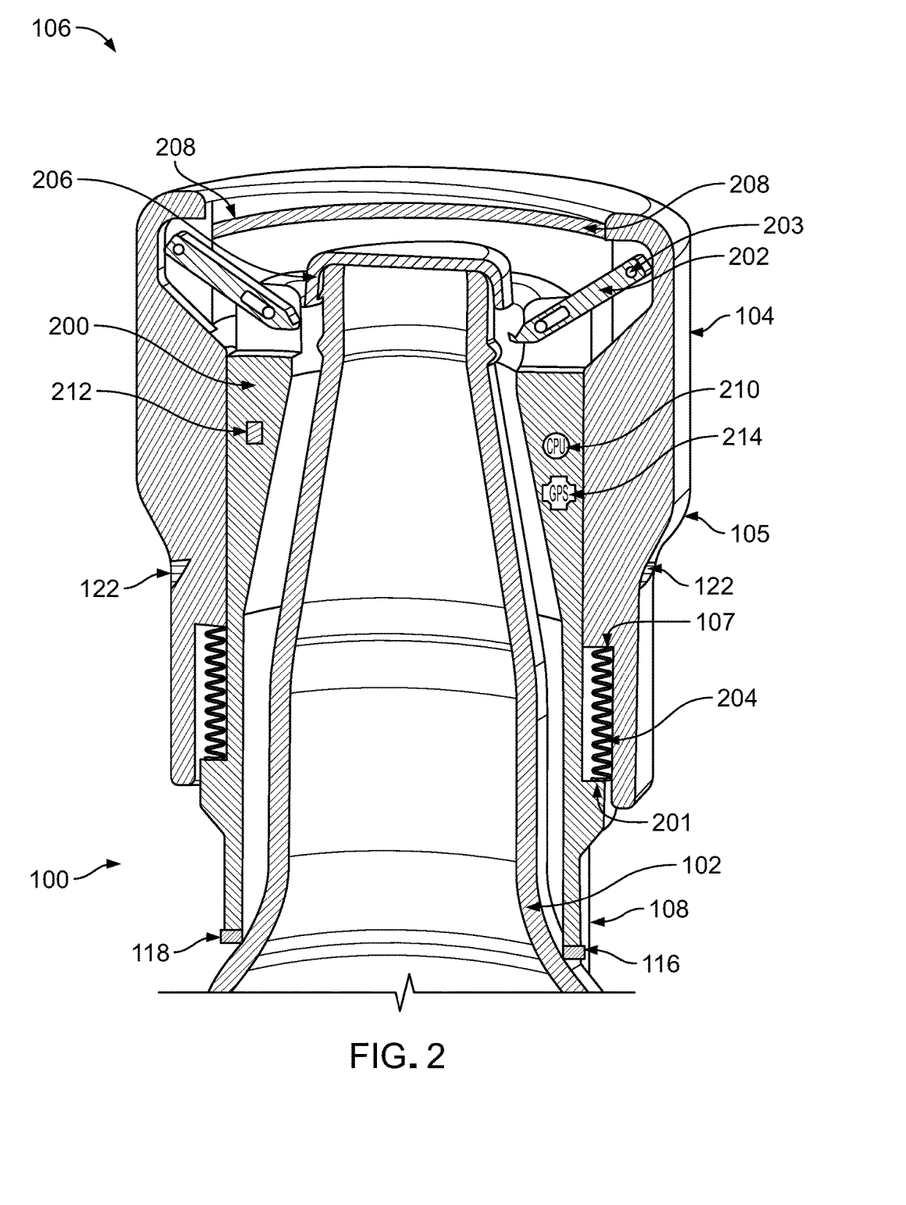
FIG. 2 is a schematic showing the inner components of the bottle opener of FIG. 1, including an inner body collar and an outer body collar.

On the bottom and inside (near top where the cap is before ejection) the opener 100 can be fastened a scanner 116 that will be able to scan the shape and/or logo of a bottle cap, and the bar code of the bottle being consumed by the end user. This feature will be especially important for brands who would like to better understand their consumers. This data will be tabulated and stored, allowing brands to receive a plethora of information, such as where geographically their consumers opened and consumed their bottles. This could be possible with the use of the GPS receiver 214. Brands can also learn how soon after purchase their products are being consumed by having the bottle cap popped off and scanned.

The technology on this opener can also connect with other appliances in the home or business that has temperature controlled features on it, such as a refrigerator.

The operation of opening a bottle and scanning the bottle cap are combined in a single action. The scanner 116 scans the bottle cap logo, and/or other brand identification features that are scannable while sitting on top of the bottle. The bottle without a cap fastened to it cannot be scanned. The action of the bottle opener actually opening and popping off the cap in conjunction with the scanner, allows for the whole function to fully function properly.

How many bottles are being purchased and consumed by an end user would be useful information to brands, as would determining on what days the end user is more likely to open and consume their bottles. Brands could offer specials accordingly. Other information could include if the beverage was consumed at a residence or park or at an event, how far away from their purchase the beverage was consumed, the temperature at which customers are consuming the product, etc. For the end user, by scanning their products they are allowing brands to better understand their interest in their product and can be rewarded with offers and bonuses for scanning a certain amount of that brand's product, such as sales or promotions. This bottle opener 100 offers both brands and end users a technological advantage over the market. The satisfaction of ejecting a bottle cap off of a bottle, mixed with the ability to scan and receive loyalty rewards as a customer, collecting data for the purpose of leveraging it to significantly increase the efficiency of marketing and promotion for brands, makes this device a game changer for this industry.

FIG. 2 shows the inside mechanical workings of the bottle opener 100 and its components. The bottle 102 is inside the bottle opener 100 and the cap 206 is still connected to the bottle 102. The outer surface 104 of the outer body collar 105 is smooth so brands can print their logos on the surface. The outer body collar 105 is slidable relative to the inner body collar 200. The opening of the bottle opener 106 allows for the cap to be ejected into the air. The bottom portion 108 of the inner body collar 200 of the opener is what contacts the bottle 102.

A wireless transmitter 212 can be implanted into the inner body collar 200 of the bottle opener 100. A scanner 208 can be infrared or optical based. The scanner 208 can also be passive or active in detecting the brand of bottle and the cap. A light source can automatically shine a light or flash when not enough ambient light is provided.

The scanner 208 is located on the inside of the outer body collar 105, and scans and identifies the brand shown on the bottle cap 206 and sends the data to a database as well as the CPU 210 implanted inside of the inner body collar 200. The CPU 210 or computing device could be more than one chip. The CPU 210 could collect and aid the wireless data exchange from the wireless transmitter 212 which can both send and receive data. The CPU 210 along with the wireless transmitter 212 and other necessary technology could make it possible for customers to sign into a bottle opener from their phone and send the geographical data of where a product was opened and consumed with the help of a GPS receiver 214. That corresponding data would be collected and the user could be able to play music and sign up for various offers from that bottle opener 100 from the establishment or business that user is currently at as well as advertisers could send that user offers, games to play, contests, etc. Games could be uploaded by business/brands for users play by themselves or against other patrons to win prizes. Future reservations could be made directly through bottle opener 100 for easier use. Patrons could also communicate with other patrons, through their bottle opener by sending a message request, for example "Message request from table one." This offers a discreet way for patrons to communicate with each other.

The temperature sensor 118 readers can include a temperature heating source that helps maintains the temperature of the bottle. Temperature sensors 118 could incorporate lasers or other sensor technology and are located on the most bottom portion of the bottler opener 100, contacting the bottle 102. Laser pulse heating of liquid particles can kill pathogenic bacteria and cancer cells. The temperature sensors 118 with the use of the wireless transmitter 212 can communicate with various appliances to help regulate the necessary temperatures desired by user. This data can also be collected and sent to brands for the purpose of knowing their customers' desired temperature for consuming their product.

The CPU 210 collects the data that is being scanned and is able to send that data wirelessly through the wireless transmitter to the necessary databases for brands. Air purification vents 122 are located in the middle of the bottle opener 100, such as very discreetly under the display 114 (shown in FIG. 1).

The inner body collar 200 is inside of the outer body collar 105 that includes the outer surface 104 of the bottle opener. This inner body collar 200 works in conjunction with the outer body collar 105 by sharing a space cavity that houses springs 204 (or another type of compression device). The springs 204 rest on a projection 201 of the inner body collar 200 at one end and at a projection 107 of the outer body collar 105 at the other end. When the outer body collar 105 is pulled downwards, the projection 107 of the outer body collar 105 exerts force on the springs 204, compressing them against the projection 201 of the inner body collar 200. Pulling down the outer body collar 105 also causes levers 202 to pivot around articulation points 203 (e.g., rotatable pins) and the levers 202 pivot upwards (ejecting bottle cap 206 off of the bottle 102 as shown in FIG. 3).

In FIG. 2 the springs 204 are in an uncompressed state. The levers 202 can be one, two, three or more in quantity. The levers 202 can be made of a metallic, plastic, or other materials necessary for ejecting the bottle cap 206. The bottle opener 100 can eject the bottle cap 206 with a lever mechanism or by other methods necessary for ejecting the bottle cap 206.

Figure 3:
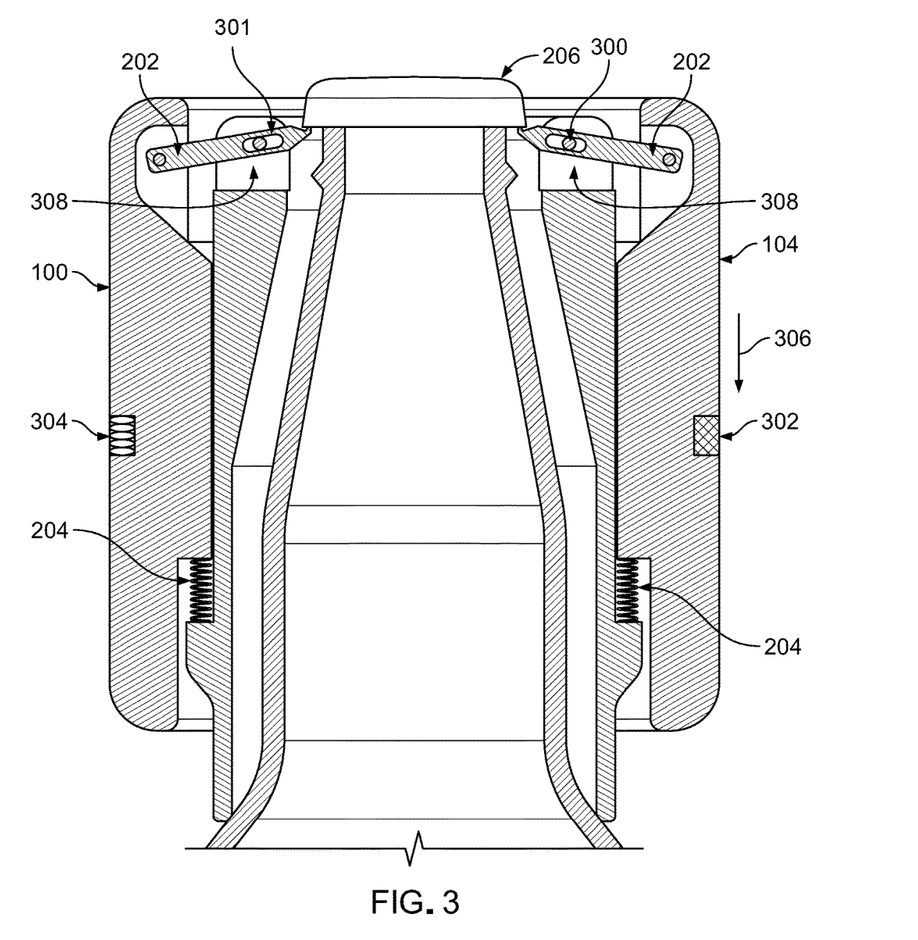
FIG. 3 is a schematic of a cross-section of the bottle opener with levers that are engaged with a bottle top and springs that are in a most compressed state.
Figure 4:
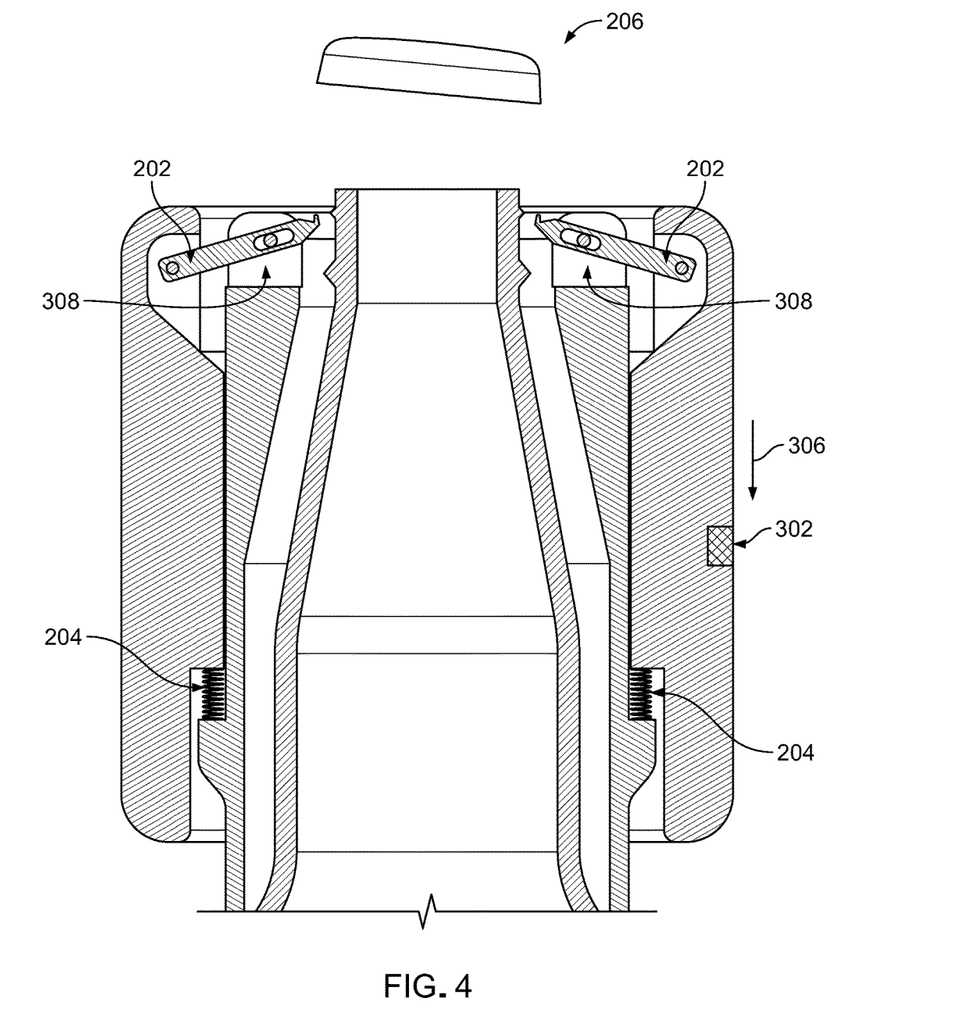
FIG. 4 is a schematic of a cross-section of the bottle opener ejecting a cap of a bottle with the springs in close to their most compressed state.

FIG. 3 shows the mechanical functionality of the bottle opener 100 as it is pulled down in the direction of arrow 306. The levers 202 pivot upwards in direction of arrow 308 around articulation points 203 and contact the bottle cap 206 right under its rim. The end of the levers 202 that contact the bottle cap 206 can have a hook, or curved portion as shown, so as to better fit under the bottle cap 206, or fit between the bottle cap 206 and the bottle 102. Pulling down the outer surface 104 of the bottle opener in the direction of the arrow 306 enough so that the springs 204 are in their most compressed state provides enough force to the levers 202 for an ejectment movement and for the bottle cap 206 to be ejected into the air (FIG. 4). The levers 202 have a slot 301 that houses one, two, or more pins 300 that allow the lever 202 to pivot upwards in direction 308 and return to its resting point after ejecting the bottle cap 206.

The bottle opener 100 can be adjustable so that it can open champagne and wine bottles as well as beer and soda bottles. Chargeable batteries 304 are located in the outer surface 104 of the bottle opener. The bottle opener 100 alternatively can be plugged into a charger and the batteries can be replaced if necessary after a period of time. Solar/light charging capabilities are also possible. Magnetic material inside of bottle opener allows for various uses, e.g., allowing bottle opener to adhere to a refrigerator or other metallic surfaces.

FIG. 4 shows the mechanical functionality of the bottle opener 100 as the bottle cap 206 is ejected. The springs 204 are fully or close to fully compressed. The levers 202 are pointing upwards. The ejection of the bottle cap 206 is done at a speed that allows it to propel approximately 3 to 5 feet or more in the air. The springs 204 can be one, two, three or more in quantity. The force applied to each of the springs 204 can be identical or be varying in force applied to each of the springs 204 or varying in the amount of force applied to the cap by each lever 202. This can allow the cap to be ejected in a certain direction; either straight up in the air or in any possible direction according to how the springs 204 are applied and fixed in the bottle opener, or how the levers are applied and fixed in the bottle opener. For example, the springs 204 can be equal in length and have the same potential energy storage. The springs 204 can be different lengths and have the same potential energy storage. The springs 204 can be different lengths and have different potential energy storage. The levers 202 can be at attached at different angles or be longer or shorter than each other and thus have differing lever arms and provide differing amounts of force to the bottle cap 206.

During the ejecting of the bottle cap 206, programmable sound effects can be implemented into the bottle opener and played via the speakers 302. Sound effects can be turned on or off.

Figure 5:
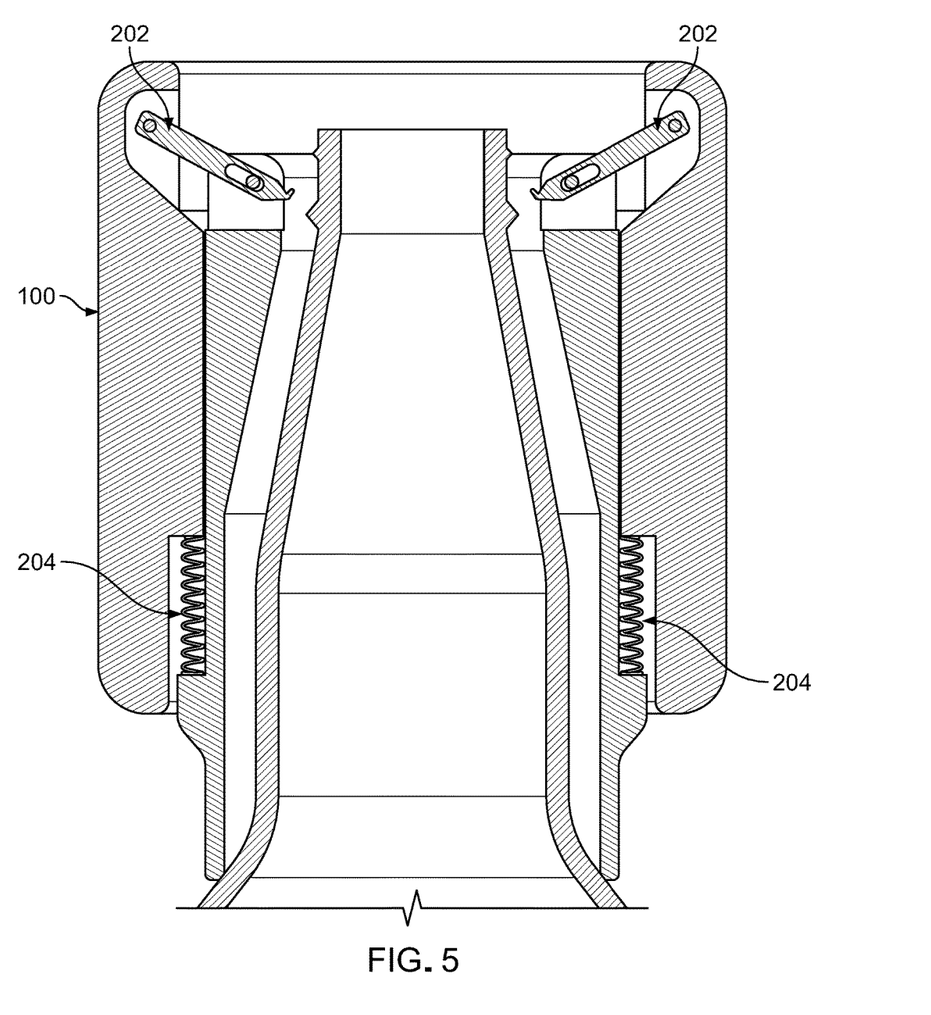
FIG. 5 is a schematic of a cross-section of the bottle opener after the bottle cap has been ejected and springs are uncompressed.

FIG. 5 shows the bottle opener 100 returning to its resting state with springs 204 uncompressed after the bottle cap 206 has been ejected and the springs 204 have been released of their tension. The levers 202 have returned to their resting position, with the single or possible double or more pins 300 sliding inside the slots 301 to accommodate the up and down motion of the levers 202 as they are pulled by outer body collar 105.

Figures 6A, 6B:
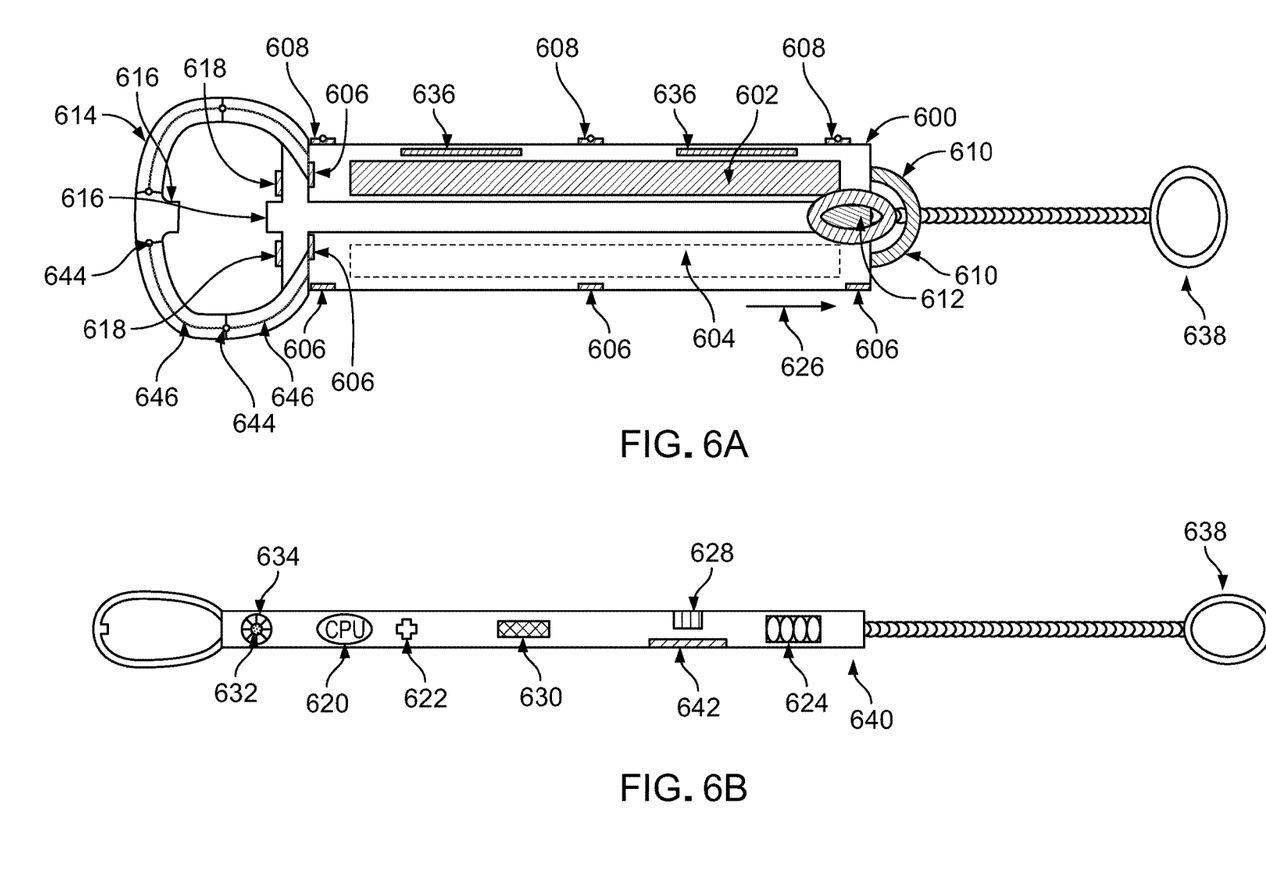
FIG. 6A is a schematic implementation of the bottle opener integrated on a keychain.
FIG. 6B is a schematic of the inner components of the bottle opener integrated on a keychain of FIG. 6A.

FIG. 6 is a keychain version of bottle opener 600. A graphical arrow 626 is shown as the direction the bottle opener 600 needs to be pulled for it to function. When pulling on the two finger slots 610, the user would compress the spring 612, so that lifting claws 616 can eject the bottle cap off of the bottle. The lifting claws 616 could be a lever or some other mechanical tool that allows for the function to take place. A round metal piece that the lifting claws 616 are part of, has collapsible joints 644 that are compressed along with the spring 612. The collapsible joints 644 houses bendable metals rods 646 that run inside the entire bottle opener 600 so that it can lessen the diameter of the round metal piece 614 once the round metal piece 614 is round the bottle neck. The bendable metal rods 646 could be made out of other various materials. Once the bottle cap is ejected, the spring 612 is decompressed.

The round metal piece 614 returns to its normal round shape to allow for another bottleneck to be placed inside of it. A lighter feature can be included as described earlier for the ability to produce fire via a chemical reaction. An advertisement area 604 on the bottle opener 600 allows brands to put their logos on the bottle opener 600. The advertisement area 604 can have messages, logos, advertisements, messages, etc. on this portion of the bottle opener 600. Scanners 606 are located in one or more locations on the bottle opener 600. The scanners 606 function in the same manner as the scanners 116 described earlier with respect to FIG. 1. The scanners 606 could be moved to other areas of the bottle opener 600 and be placed in a downward angle for when the bottle is entering the round metal piece 614. The round metal piece 614 could assist the function of ejecting the bottle cap off of the bottle. The round metal piece 614 could also be claw shaped or other various shapes and made out of other various materials. The display 602 is located next to the spring 612. The display 602 functions in the same manner as the display 114 described earlier with respect to FIG. 1. A geo mapping technology 636 tool is located above the display 602 or can be located in other places. The geo mapping technology 636 functions in the same manner as the geo mapping technology 128 described earlier with respect to FIG. 1.

The temperature sensors 618 are positioned inside of the round metal piece 614. The temperature sensors 618 functions in the same manner as the temperature sensors 118 described earlier with respect to FIG. 1. The microphone 632 is located inside of the breathalyzer 634 on the side of the bottle opener 600. The microphone 632 and the breathalyzer 634 functions in the same manner as the microphone 126 and the breathalyzer 130 described earlier with respect to FIG. 1. The CPU 620 is located inside of the bottle opener 600 as well as the GPS receiver 622. The CPU 620 and the GPS receiver 622 function in the same manner as the CPU 210 and the GPS receiver 214 described earlier with respect to FIG. 2. The wireless transmitter 630 is located in the middle of the bottle opener 600. The wireless transmitter 630 functions in the same manner as the wireless transmitter 112 described earlier with respect to FIG. 1. The air purification system 628 is on the edge of the bottle opener 600 near the back. The air purification system 628 functions in the same manner as the air purification system 122 described earlier with respect to FIG. 1. Batteries 624 are close to the keychain section of the bottle opener 600. The batteries 624 function in the same manner as the batteries 304 described earlier with respect to FIG. 3. The keychain loop 638 for the bottle opener 600 to be attached to a set of keys is made out of metal or other various materials. The keychain loop 638 can be a single loop, double loop, or more loops and could be assisting the bottle opener 600. Sound speakers 642 located next to the batteries 624 and opposite the air purification system 628. The sound speakers 642 function in the same manner as the sound speakers 124 described earlier with respect to FIG. 1. The bottle opener 600 at the side/inside view 640 shows the inner technology that allows the bottle opener 600 to function.

Figure 7:
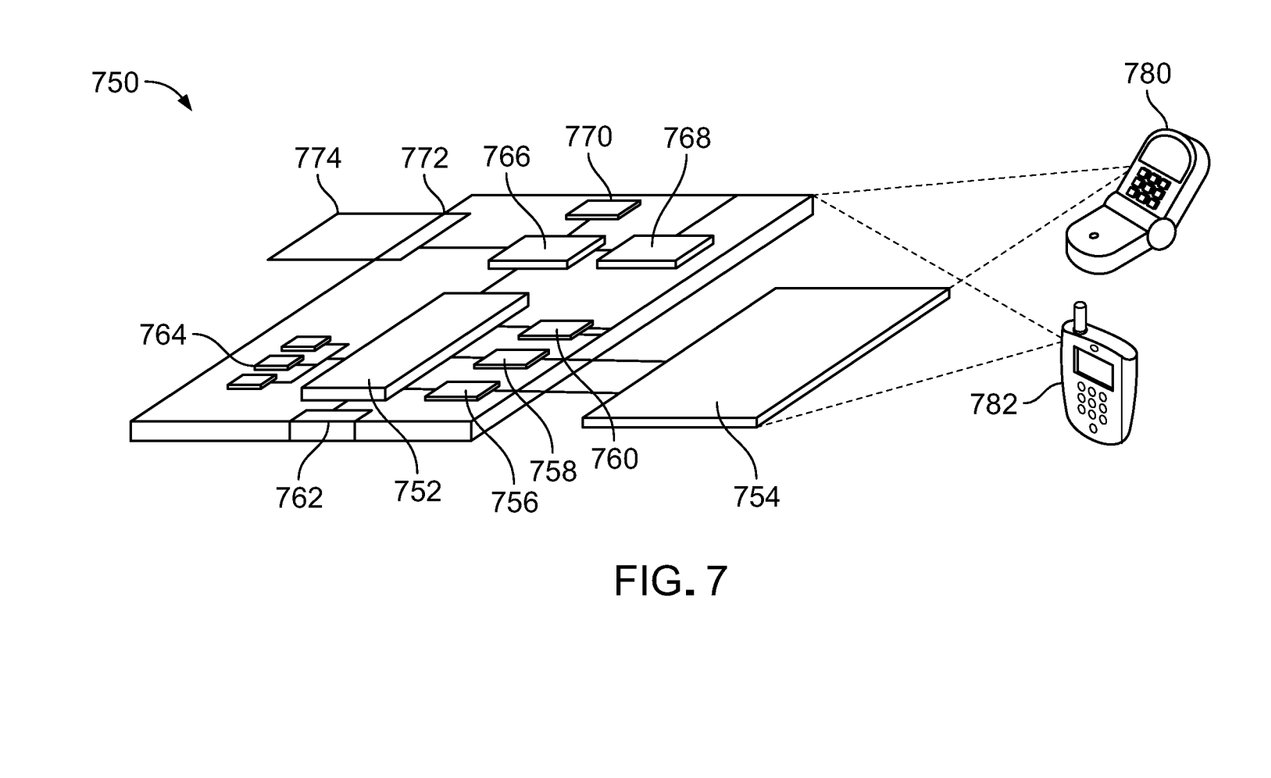
FIG. 7 is a schematic block diagram of computing devices.

Referring to FIG. 7, a block diagram of computing devices 750 that may be used to implement the systems and methods described in this document, as either a client or as a server or plurality of servers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units.

In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS receiver module 770 may provide additional wireless data to device 750, which may be used as appropriate by applications running on device 750.

Device 750 may also communicate audibly using audio codec 660, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750. The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Implementations of the subject matter and the functional operations described in this specification can be implemented in digital electronic circuitry, or in computer software, firmware, or hardware, including the structures disclosed in this specification and their structural equivalents, or in combinations of one or more of them.

Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A propagated signal is an artificially generated signal, e.g., a machine-generated electrical, optical, or electromagnetic signal that is generated to encode information for transmission to suitable receiver apparatus. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magnetooptical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory can be supplemented by, or incorporated in, special purpose logic circuitry. To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer.

Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the invention have been described.

Other implementations are within the scope of the following claims. For example, the actions recited in the claims can be performed in a different order and still achieve desirable results. For example, the bottle opener can also include sensors and emitters that provide purifying ultra violet (UV) lights, antimicrobial, fiber optic and other light technology to clean and detect the caloric and other nutritional/informational qualities of contents inside a bottle. Nevertheless, it will be understood that various modifications may be made without departing from the spirit and scope of the invention. Accordingly, other embodiments are within the scope of the following claims.

What is claimed is:

1. A bottle opener apparatus comprising:
an inner body collar configured to rest on a top portion of a bottle placed within the bottle opener;
an outer body collar slidably connected to the inner body collar;
one or more springs attached to the inner body collar and the outer body collar, the one or more springs configured to be compressed or released when the outer collar slides relative to the inner body collar;
one or more levers pivotably attached the outer body collar, the one or more levers configured to remove a bottle cap from the bottle and eject the bottle cap into the air when the outer collar slides relative to the inner body collar in an ejection movement, wherein the levers are pivotably attached to the outer body collar at one end and to the inner body collar near a second end;
one or more sensors configured to collect data when the bottle is placed within the inner collar; and
a transmitter configured to transmit the collected data to an external receiver.

2. The apparatus of claim 1, wherein the collected data comprises geographical location and/or time information.

3. The apparatus of claim 1, wherein the springs are configured to eject the bottle cap into the air straight from the bottle opener or at an angle.

4. The apparatus of claim 1, wherein the bottle opener changes shape while it is ejecting the bottle cap into the air and then returns to its original shape.

5. The apparatus of claim 1, wherein the bottle opener is configured to fit onto a keychain.

6. The apparatus of claim 1, comprising one or more displays on an outer surface of the bottle opener.

7. The apparatus of claim 6, wherein the one or more displays are bendable and detachable from the bottle opener.

8. The apparatus of claim 7, wherein the one or more displays are configured to be flattened to provide a larger and flatter display surface.

9. The apparatus of claim 1, wherein the levers are configured to move from a direction pointing generally downwards to a generally upwards direction when the outer body collar is displaced relative to the inner body collar.

10. The apparatus of claim 1, wherein the outer body collar has a projection and the inner body collar has a projection that together compress the springs when the outer body collar is displaced relative to the inner body collar.

11. The apparatus of claim 1, wherein the levers comprise a slot near the second end, the slots configured to receive a pin attached to the inner collar body.

12. The apparatus of claim 1, wherein the bottle opener is configured to return to an initial rest state with the springs uncompressed following the ejection movement.

13. A bottle opener system comprising:
a bottle opener apparatus comprising:
an inner body collar configured to rest on a top portion of a bottle placed within the bottle opener;
an outer body collar slidably connected to the inner body collar;
one or more springs attached to the inner body collar and the outer body collar, the one or more springs configured to be compressed or released when the outer body collar slides relative to the inner body collar;
one or more levers pivotably attached the outer body collar, the one or more levers configured to remove a bottle cap from the bottle and eject the bottle cap into the air when the outer body collar slides relative to the inner body collar in an ejection movement, wherein the levers are pivotably attached to the outer body collar at one end and to the inner body collar near a second end;
one or more sensors configured to collect data bottle when the bottle is placed within the inner collar; and
a transmitter configured to transmit the collected data to an external receiver, and
an external computing system configured to receive the data transmitted by the transmitter.

14. The apparatus of claim 13, wherein the collected data comprises geographical location and/or time information.

15. The apparatus of claim 13, comprising one or more displays on an outer surface of the bottle opener.

16. The apparatus of claim 13, wherein the levers are configured to move from a direction pointing generally downwards to a generally upwards direction when the outer body collar is displaced relative to the inner body collar.

17. The apparatus of claim 13, wherein the outer body collar has a projection and the inner body collar has a projection that together compress the springs when the outer body collar is displaced relative to the inner body collar.

18. The apparatus of claim 13, wherein the levers comprise a slot near the second end, the slots configured to receive a pin attached to the inner collar body.

* * * * *

UNITED STATES PATENT AND TRADEMARK OFFICE
CERTIFICATE OF CORRECTION

PATENT NO.         : 10,023,452 B2
APPLICATION NO.    : 15/801480
DATED              : July 17, 2018
INVENTOR(S)        : Clinton Graham It is certified that error appears in the above-identified patent and that said Letters Patent is hereby corrected as shown below:

On the Title Page

Column 2 (Abstract): After "attached" insert -- to --.

In the Claims

Column 15, Line 12 (approx.): In Claim 1, after "attached" insert -- to --.

Column 16, Line 17 (approx.): In Claim 13, after "attached" insert -- to --.

Signed and Sealed this
Twenty-fifth Day of June, 2019

Andrei Iancu
*Director of the United States Patent and Trademark Office*